United States Patent
Gilbert

(10) Patent No.: US 11,036,442 B2
(45) Date of Patent: Jun. 15, 2021

(54) TRANSPARENT INTERACTIVE PRINTING INTERFACE

(71) Applicant: UNIVERSITY OF FLORIDA RESEARCH FOUNDATION, INCORPORATED, Gainesville, FL (US)

(72) Inventor: Juan E. Gilbert, Gainesville, FL (US)

(73) Assignee: UNIVERSITY OF FLORIDA RESEARCH FOUNDATION, INCORPORATED, Gainesville, FL (US)

(*) Notice: Subject to any disclaimer, the term of this patent is extended or adjusted under 35 U.S.C. 154(b) by 0 days.

(21) Appl. No.: 16/849,785

(22) Filed: Apr. 15, 2020

(65) Prior Publication Data
US 2020/0356315 A1     Nov. 12, 2020

Related U.S. Application Data

(60) Provisional application No. 62/846,118, filed on May 10, 2019.

(51) Int. Cl.
| | |
|---|---|
| G06F 3/12 | (2006.01) |
| G06F 3/0488 | (2013.01) |
| G06F 3/01 | (2006.01) |
| G07C 13/00 | (2006.01) |

(52) U.S. Cl.
CPC .......... *G06F 3/1204* (2013.01); *G06F 3/012* (2013.01); *G06F 3/013* (2013.01); *G06F 3/04883* (2013.01); *G06F 3/1208* (2013.01); *G06F 3/1256* (2013.01); *G07C 13/00* (2013.01)

(58) Field of Classification Search
CPC combination set(s) only.
See application file for complete search history.

(56) References Cited

U.S. PATENT DOCUMENTS

| | | | |
|---|---|---|---|
| 2005/0218225 A1* | 10/2005 | Johnson | G07C 13/00 235/386 |
| 2014/0231513 A1* | 8/2014 | Brockhouse | G07C 13/02 235/386 |
| 2015/0302247 A1* | 10/2015 | Mohanakrishnan | G06K 9/6215 382/218 |
| 2015/0371407 A1* | 12/2015 | Kim | G06T 11/40 345/633 |
| 2019/0208887 A1* | 7/2019 | Besen | G06F 3/012 |

(Continued)

*Primary Examiner* — Helen Zong
(74) *Attorney, Agent, or Firm* — Alston & Bird LLP

(57) ABSTRACT

Described generally herein are systems, apparatuses, methods, and computer programs to assist a user in marking a document in response to the user engaging an intuitive, transparent interface. The apparatus can be caused to receive, in response to a gesture by a user, an indication related to a region of a transparent interactive display, the region of the transparent interactive display corresponding to a region of a document viewable by the user through the transparent interactive display. Apparatus can determine, based at least upon the indication, one or more fields of the document associated with the indication and input information associated with the one or more fields of the document. Apparatus can transmit a signal indicative of the one or more fields of the document and the input information to a printing device, the printing device configured to print the input information in the fields of the document.

21 Claims, 8 Drawing Sheets

(56) References Cited

U.S. PATENT DOCUMENTS

| | | | |
|---|---|---|---|
| 2019/0208893 A1* | 7/2019 | Besen | A45D 44/005 |
| 2020/0027297 A1* | 1/2020 | Obradovic | G06F 3/017 |
| 2020/0089323 A1* | 3/2020 | Chang | G06K 9/00624 |
| 2020/0242872 A1* | 7/2020 | Deutsch | H04L 9/0894 |
| 2021/0042839 A1* | 2/2021 | Adamec | H04L 9/0643 |

* cited by examiner

TRANSPARENT INTERACTIVE PRINTING INTERFACE

CROSS-REFERENCE TO RELATED APPLICATIONS

This application claims priority to, and the benefit of, U.S. Provisional Patent Application Ser. No. 62/846,118, filed May 10, 2019, entitled "Transparent Interactive Printing Interface," the entire disclosures of which are hereby incorporated herein by reference in their entirety for all purposes.

FIELD OF THE INVENTION

Example embodiments described herein relate generally to the field of displays, and in particular transparent, interactive interfaces.

BACKGROUND

Ballot-marking devices (BMDs) such as electronic ballot markers (EBMs), electronically-assisted ballot markers, and voting machines are often non-transparent, hackable, and overly complex. Such conventional devices often result in a trade-off between consistency and transparency, for instance because using paper ballots typically results in a relatively large amount of human error and erroneous ballots being discarded, however it is typically difficult or impossible to fully examine and trace the process and result of entering selections for a ballot using conventional BMDs and EMBs.

BRIEF SUMMARY

In general, embodiments of the present invention provide methods, apparatus, systems, computing devices, computing entities, and/or the like for transparent, interactive printing interfaces for ballot-processing. Certain embodiments utilize systems, methods, and computer program products that enable a user to select a ballot decision for a particular field on the transparent interactive printing interface, resulting in real-time printing on a paper ballot or the like positioned behind the transparent interactive printing interface.

In accordance with one aspect, a method is provided. In one embodiment, the method can be a computer-implemented method comprising receiving, in response to a gesture by a user, an indication related to a region of a transparent interactive display, the region of the transparent interactive display corresponding to a region of a document viewable by the user through the transparent interactive display. In some embodiments, the computer-implemented method can further comprise determining, based at least upon the indication, one or more fields of the document associated with the indication and input information associated with the one or more fields of the document. In some embodiments, the computer-implemented method can further comprise transmitting a signal indicative of the one or more fields of the document and the input information to a printing device, the printing device configured to print the input information in the one or more fields of the document. IN some embodiments, the document can be one of a voting ballot, a survey, an application, a poll, a canvass, an assessment, a declaration, a written oath, a form, a bill, a check, a statement, a deed, a manuscript, and a certificate. In some embodiments, the computer-implemented method can further comprise causing the printing device to print the input information in the one or more fields of the document.

In accordance with another aspect, a computer program product is provided. The computer program product may comprise at least one computer-readable storage medium having computer-readable program code portions stored therein, the computer-readable program code portions comprising executable portions configured to carry out a process, such as a computer-implemented method. In some embodiments, the computer program product can comprise a non-transitory computer storage medium comprising instructions configured to cause one or more processors to at least perform receiving, in response to a gesture by a user, an indication related to a region of a transparent interactive display, the region of the transparent interactive display corresponding to a region of a document viewable by the user through the transparent interactive display. In some embodiments, the computer program product can comprise a non-transitory computer storage medium comprising instructions configured to cause one or more processors to at least perform determining, based at least upon the indication, one or more fields of the document associated with the indication and input information associated with the one or more fields of the document. In some embodiments, the computer program product can comprise a non-transitory computer storage medium comprising instructions configured to cause one or more processors to at least perform transmitting a signal indicative of the one or more fields of the document and the input information to a printing device, the printing device configured to print the input information in the one or more fields of the document. In some embodiments, the document is one of a voting ballot, a survey, an application, a poll, a canvass, an assessment, a declaration, a written oath, a form, a bill, a check, a statement, a deed, a manuscript, and a certificate. In some embodiments, the computer program product can comprise a non-transitory computer storage medium comprising instructions configured to cause one or more processors to at least perform causing the printing device to print the input information in the one or more fields of the document.

In accordance with another aspect, an apparatus comprising a transparent, interactive interface operably coupled to a printing device and configured to retain a printing substrate within or behind the transparent, interactive interface is provided. In one embodiment, the apparatus may be configured to carry out a computer-implemented method. In some embodiments, the apparatus can be configured to carry out a computer-implemented method comprising receiving, in response to a gesture by a user, an indication related to a region of a transparent interactive display, the region of the transparent interactive display corresponding to a region of a document viewable by the user through the transparent interactive display. In some embodiments, the apparatus can be configured to carry out a computer-implemented method further comprising determining, based at least upon the indication, one or more fields of the document associated with the indication and input information associated with the one or more fields of the document. In some embodiments, the apparatus can be configured to carry out a computer-implemented method further comprising transmitting a signal indicative of the one or more fields of the document and the input information to a printing device, the printing device configured to print the input information in the one or more fields of the document. In some embodiments, the document can be one of a voting ballot, a survey, an application, a poll, a canvass, an assessment, a declaration, a written oath, a form, a bill, a check, a statement, a deed, a manuscript, and a certificate. In some embodiments, the apparatus can be further configured to carry out a computer-implemented method further comprising causing the printing device to print the input information in the one or more fields of the document.

In accordance with yet another aspect, an apparatus can comprise means, such as at least one processor and at least one memory including computer program code, for carrying out a computer-implemented method. In some embodiments, the apparatus can comprise means for receiving, in response to a gesture by a user, an indication related to a region of a transparent interactive display, the region of the transparent interactive display corresponding to a region of a document viewable by the user through the transparent interactive display. In some embodiments, the apparatus can further comprise means for determining, based at least upon the indication, one or more fields of the document associated with the indication and input information associated with the one or more fields of the document. In some embodiments, the apparatus can further comprise means for transmitting a signal indicative of the one or more fields of the document and the input information to a printing device, the printing device configured to print the input information in the one or more fields of the document. In some embodiments, the document can be one of a voting ballot, a survey, an application, a poll, a canvass, an assessment, a declaration, a written oath, a form, a bill, a check, a statement, a deed, a manuscript, and a certificate. In some embodiments, the apparatus can further comprise means for causing the printing device to print the input information in the one or more fields of the document.

In accordance with still another embodiment, a method can be carried out that comprises: receiving, in response to one or more gestures made by a user, one or more indications related to a region of a transparent interactive display, the region of the transparent interactive display corresponding to a region of a physical document disposed within or behind the transparent interactive display; determining, based at least upon the indication, one or more fields of the document associated with the indication and input information associated with the one or more fields of the document; and transmitting a signal indicative of the one or more fields of the document and the input information to a printing device, the printing device configured to print the input information in the one or more fields of the document. In some embodiments, the document is one of a voting ballot, a survey, an application, a poll, a canvass, an assessment, a declaration, a written oath, a form, a bill, a check, a statement, a deed, a manuscript, and a certificate. In some embodiments, the region of the physical document is viewable by the user through the transparent interactive display. In some embodiments, the method can further comprise: causing the printing device to print the input information in the one or more fields of the document. In some embodiments, the method can further comprise: receiving, in response to a second gesture made by the user, a second indication related to a second region of the transparent interactive display; determining, based at least upon the second indication, one or more second fields of the document associated with the second indication and second input information associated with the one or more second fields of the document; and transmitting a second signal indicative of the one or more second fields of the document and the second input information to the printing device, thereby causing the printing device to print the second input information in the one or more second fields of the document. In some embodiments, the transparent interactive display comprises a touch-sensitive display. In some embodiments, the one or more gestures made by the user comprise a touch, a tap, a swipe, or a translational motion by a finger of the user on the touch-sensitive display. In some embodiments, the method can further comprise: determining, using a gaze tracking system, whether the user has reviewed the printed input information in the one or more fields of the document; in an instance in which it is determined that the user has reviewed the printed input, approving the input information printed in the one or more fields of the document; and/or, in an instance in which it is determined that the user has not reviewed the printed input, causing a reminder to be provided to the user. In some embodiments, the gaze tracking system comprises one or more cameras configured to capture images of the user's face, and one or more processors configured to determine a direction of viewing based at least upon the images of the user's face and determine if the direction of viewing corresponds to the one or more fields of the document.

According to yet another embodiment, an apparatus can be provided that comprises: at least one processor; and at least one non-transitory memory comprising program code, wherein the at least one non-transitory memory and the program code are configured to, with the at least one processor, cause the apparatus to: receive, in response to a gesture by a user, an indication related to a region of a transparent interactive display, the region of the transparent interactive display corresponding to a region of a document viewable by the user through the transparent interactive display; determine, based at least upon the indication, one or more fields of the document associated with the indication and input information associated with the one or more fields of the document; and transmit a signal indicative of the one or more fields of the document and the input information to a printing device, the printing device configured to print the input information in the one or more fields of the document. In some embodiments, the document is one of: a voting ballot, a survey, an application, a poll, a canvass, an assessment, a declaration, a written oath, a form, a bill, a check, a statement, a deed, a manuscript, or a certificate. In some embodiments, the region of the physical document is viewable by the user through the transparent interactive display. In some embodiments, the at least one non-transitory memory and the program code are further configured to, with the at least one processor, cause the apparatus to: cause the printing device to print the input information in the one or more fields of the document. In some embodiments, the at least one non-transitory memory and the program code are further configured to, with the at least one processor, cause the apparatus to: receive, in response to a second gesture made by the user, a second indication related to a second region of the transparent interactive display; determine, based at least upon the second indication, one or more second fields of the document associated with the second indication and second input information associated with the one or more second fields of the document; and transmit a second signal indicative of the one or more second fields of the document and the second input information to the printing device, thereby causing the printing device to print the second input information in the one or more second fields of the document. In some embodiments, the transparent interactive display comprises a touch-sensitive display. In some embodiments, the one or more gestures made by the user comprise a touch, a tap, a swipe, or a translational motion by a finger of the user on the touch-sensitive display. In some embodiments, the at least one non-transitory memory and the program code are further configured to, with the at least one processor, cause the apparatus to: determine, using a gaze tracking system, whether the user has reviewed the printed input information in the one or more fields of the document; in an instance in which it is determined that the user has reviewed the printed input, approving the input information printed in the one or more fields of the document; and, in an instance in which it is determined that the user has not reviewed the printed input, causing a reminder to be provided to the user. In some embodiments, the gaze tracking system comprises one or more cameras configured to capture images of the user's face, and one or more processors configured to determine a direction of viewing based at least upon the images of the user's face and determine if the direction of viewing corresponds to the one or more fields of the document.

According to still another embodiment, a non-transitory computer storage medium can be provided that comprises instructions configured to cause one or more processors to at least at least perform: receiving, in response to one or more gestures made by a user, one or more indications related to a region of a transparent interactive display, the region of the transparent interactive display corresponding to a region of a physical document disposed within or behind the transparent interactive display; determining, based at least upon the indication, one or more fields of the document associated with the indication and input information associated with the one or more fields of the document; and transmitting a signal indicative of the one or more fields of the document and the input information to a printing device, the printing device configured to print the input information in the one or more fields of the document. In some embodiments, the non-transitory computer storage medium can further comprise instructions configured to cause the one or more processors to at least perform: causing the printing device to print the input information in the one or more fields of the document. In some embodiments, the non-transitory computer storage medium can further comprise instructions configured to cause the one or more processors to at least perform: determine, using a gaze tracking system, whether the user has reviewed the printed input information in the one or more fields of the document; in an instance in which it is determined that the user has reviewed the printed input, approve the input information printed in the one or more fields of the document; and, in an instance in which it is determined that the user has not reviewed the printed input, cause a reminder to be provided to the user. In some embodiments, the document is one of: a voting ballot, a survey, an application, a poll, a canvass, an assessment, a declaration, a written oath, a form, a bill, a check, a statement, a deed, a manuscript, or a certificate. In some embodiments, the region of the physical document is viewable by the user through the transparent interactive display. In some embodiments, the non-transitory computer storage medium can further comprise instructions configured to cause the one or more processors to at least perform: cause the printing device to print the input information in the one or more fields of the document. In some embodiments, the non-transitory computer storage medium can further comprise instructions configured to cause the one or more processors to at least perform: receive, in response to a second gesture made by the user, a second indication related to a second region of the transparent interactive display; determine, based at least upon the second indication, one or more second fields of the document associated with the second indication and second input information associated with the one or more second fields of the document; and transmit a second signal indicative of the one or more second fields of the document and the second input information to the printing device, thereby causing the printing device to print the second input information in the one or more second fields of the document. In some embodiments, the transparent interactive display comprises a touch-sensitive display. In some embodiments, the one or more gestures made by the user comprise a touch, a tap, a swipe, or a translational motion by a finger of the user on the touch-sensitive display. In some embodiments, the non-transitory computer storage medium can further comprise instructions configured to cause the one or more processors to at least perform: determine, using a gaze tracking system, whether the user has reviewed the printed input information in the one or more fields of the document; in an instance in which it is determined that the user has reviewed the printed input, approving the input information printed in the one or more fields of the document; and, in an instance in which it is determined that the user has not reviewed the printed input, causing a reminder to be provided to the user. In some embodiments, the gaze tracking system comprises one or more cameras configured to capture images of the user's face, and one or more processors configured to determine a direction of viewing based at least upon the images of the user's face and determine if the direction of viewing corresponds to the one or more fields of the document.

BRIEF DESCRIPTION OF THE DRAWINGS

Figure 1:
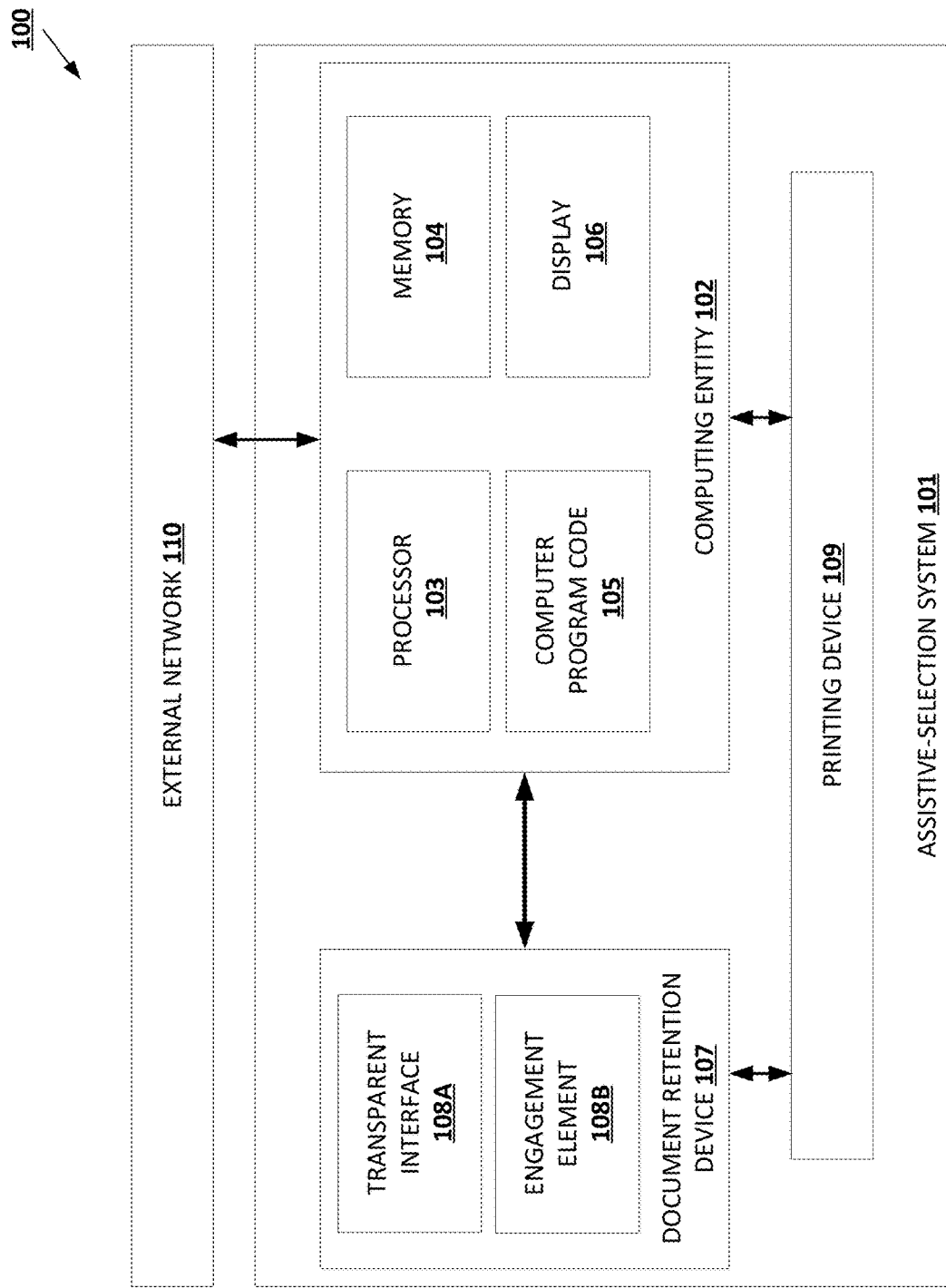
Figure 2:
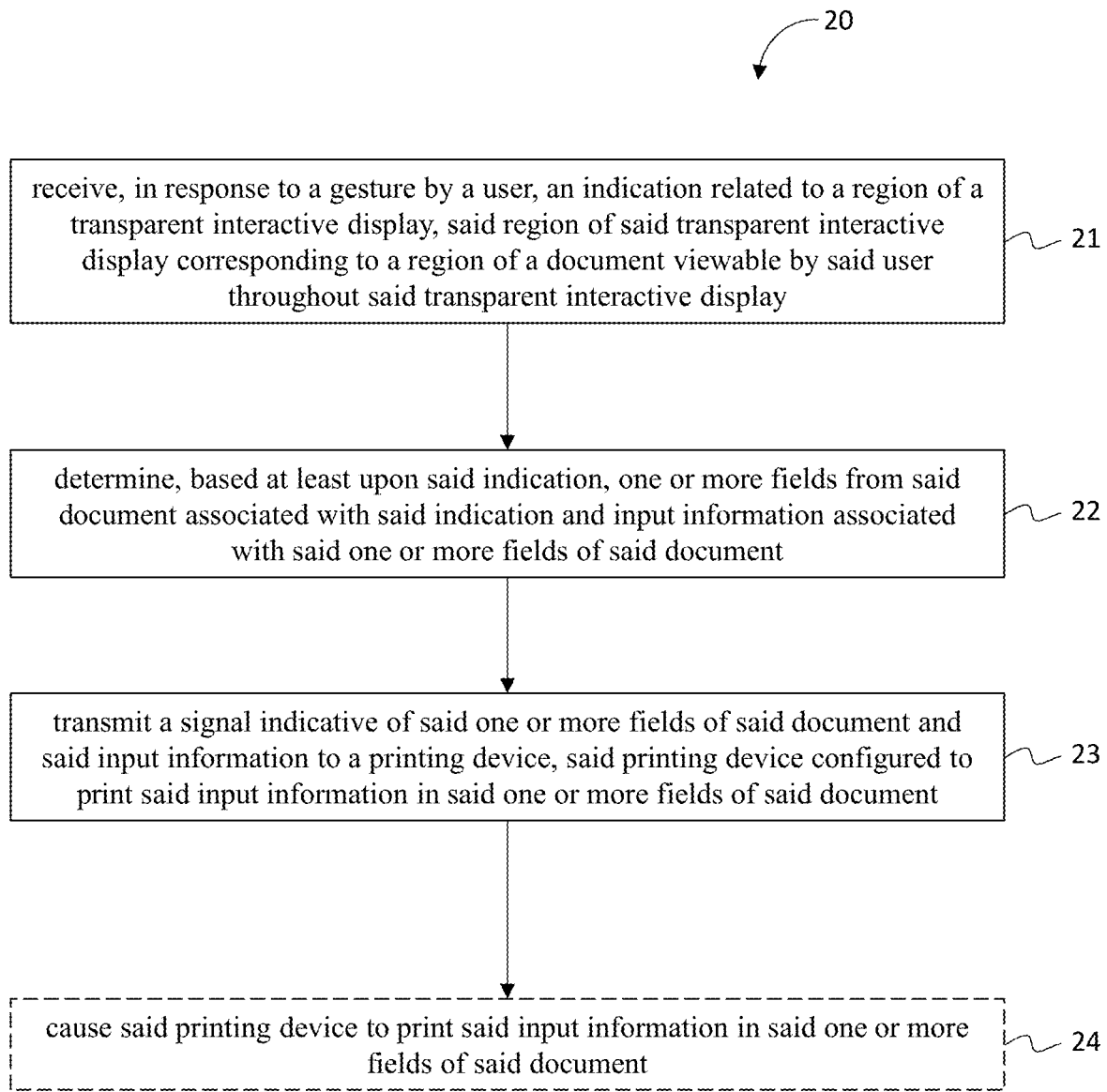
Figure 3A:
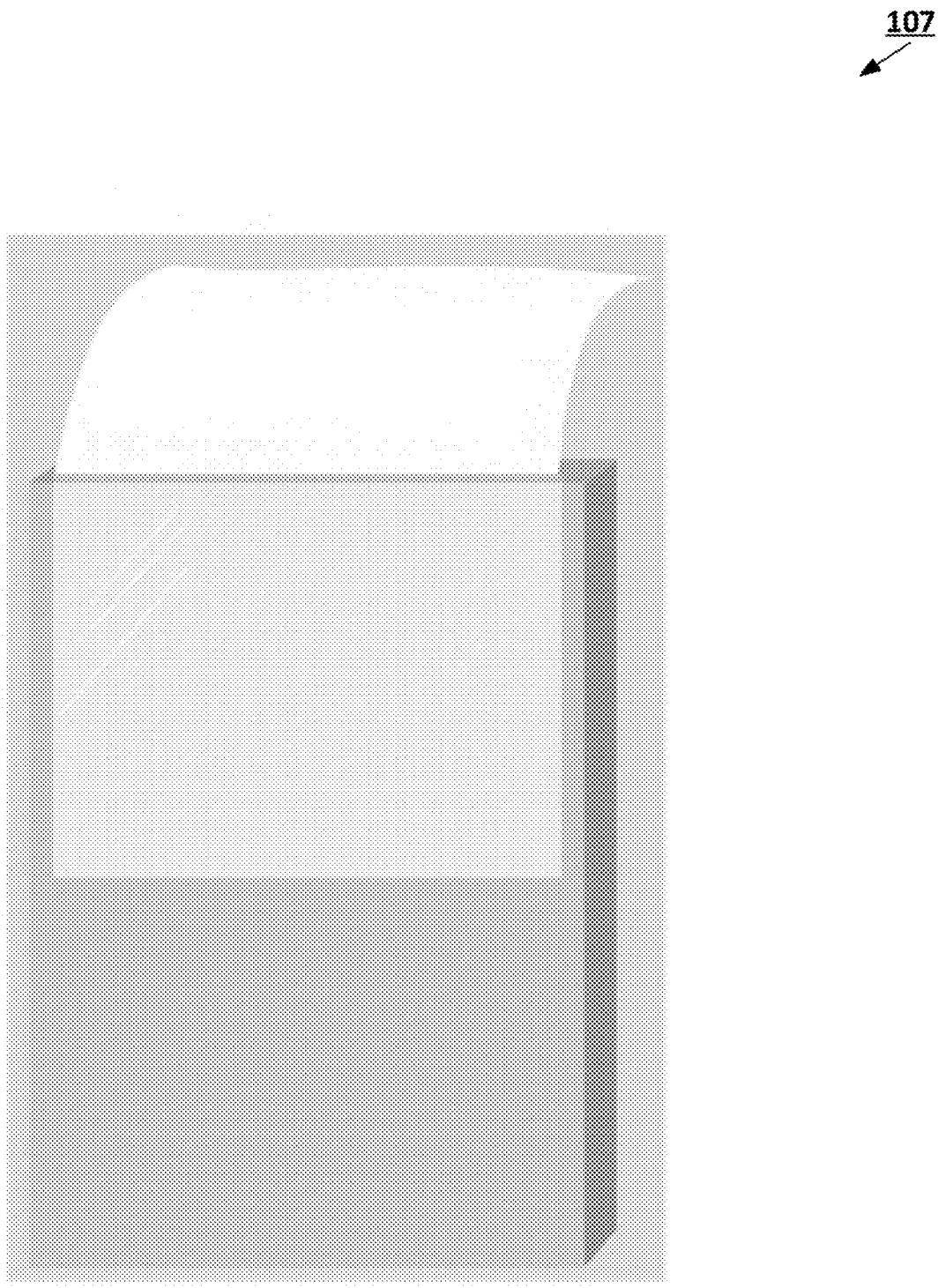
Figure 3B:
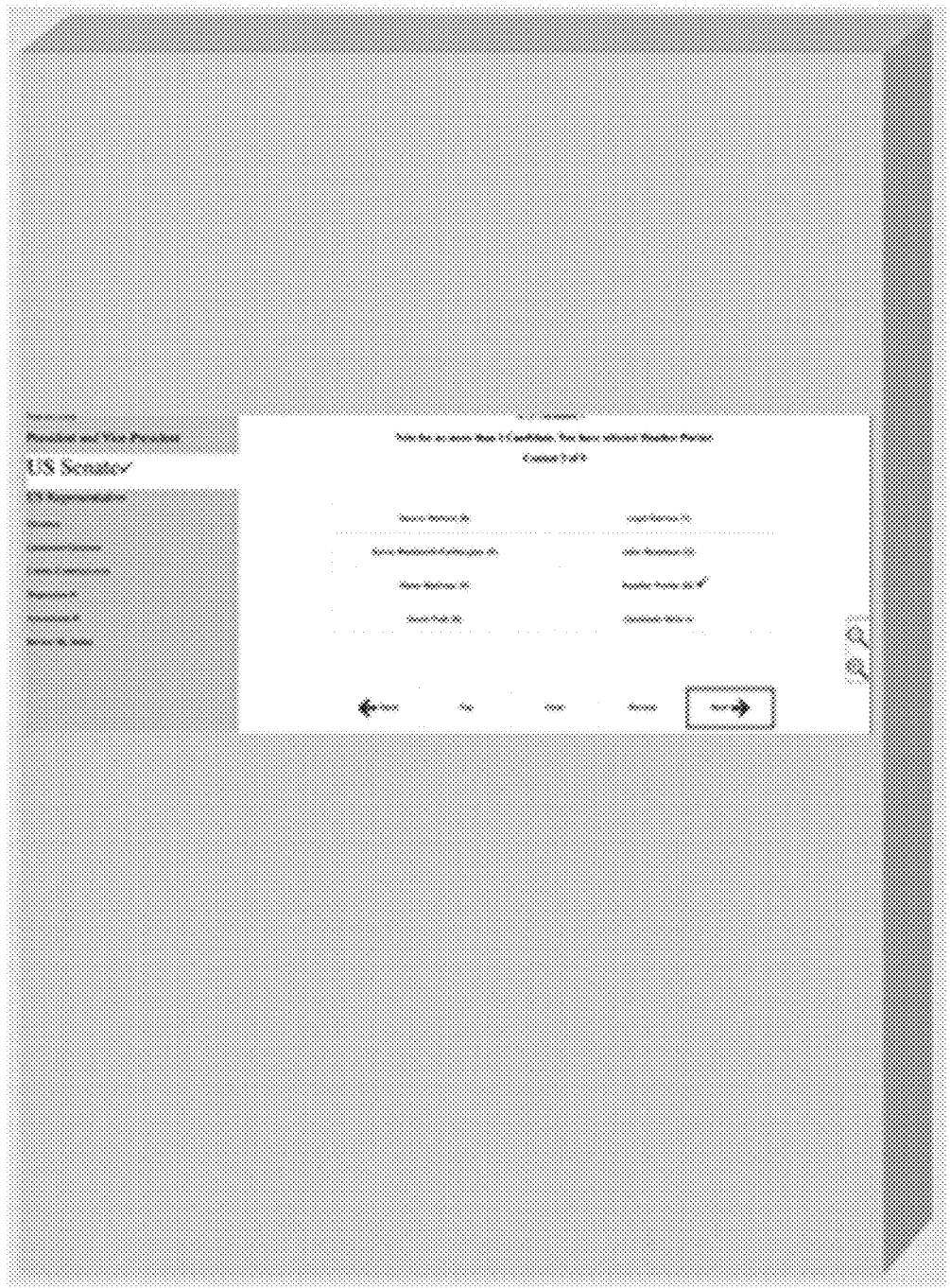
Figure 3C:
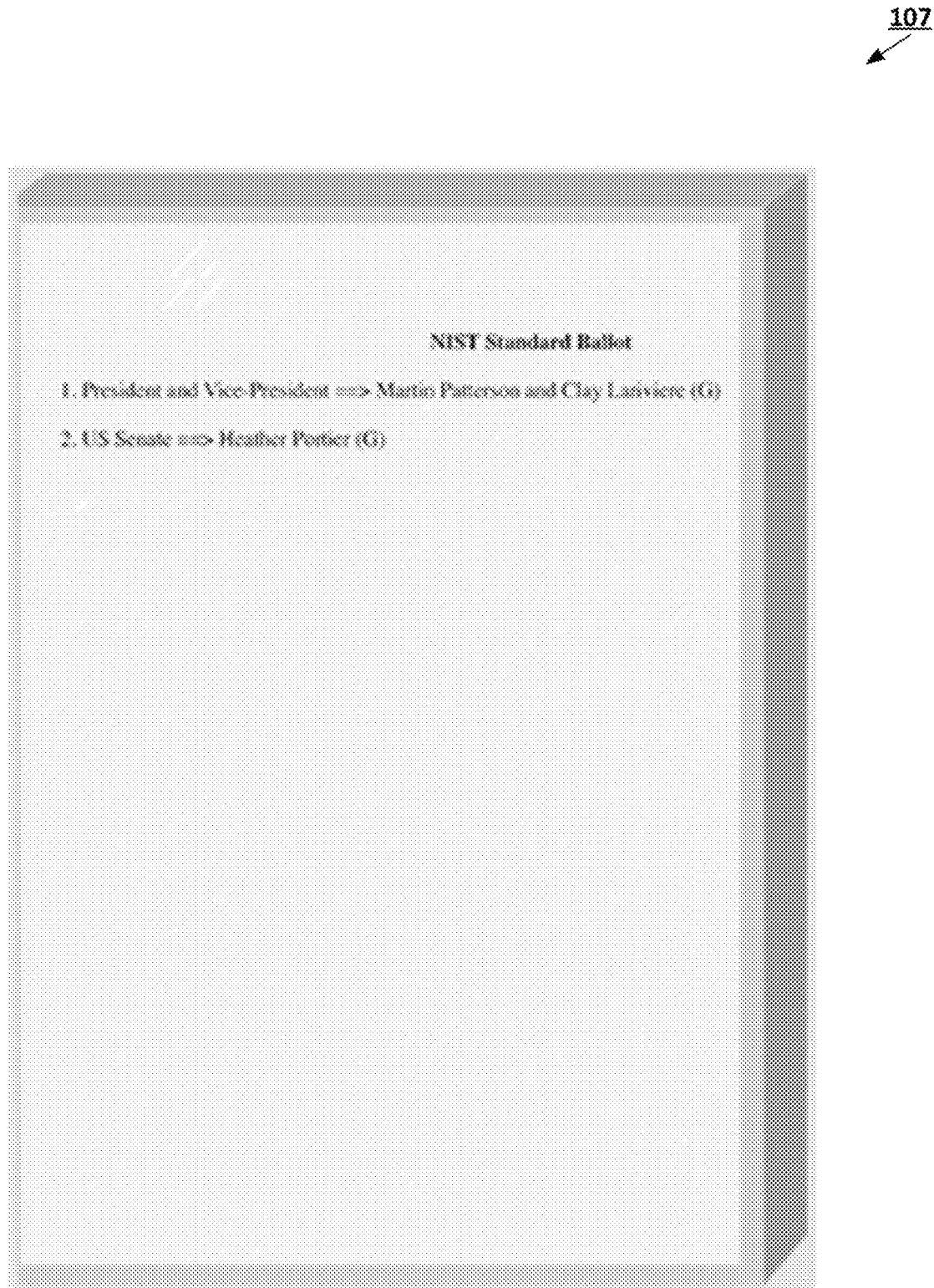
Figure 4:
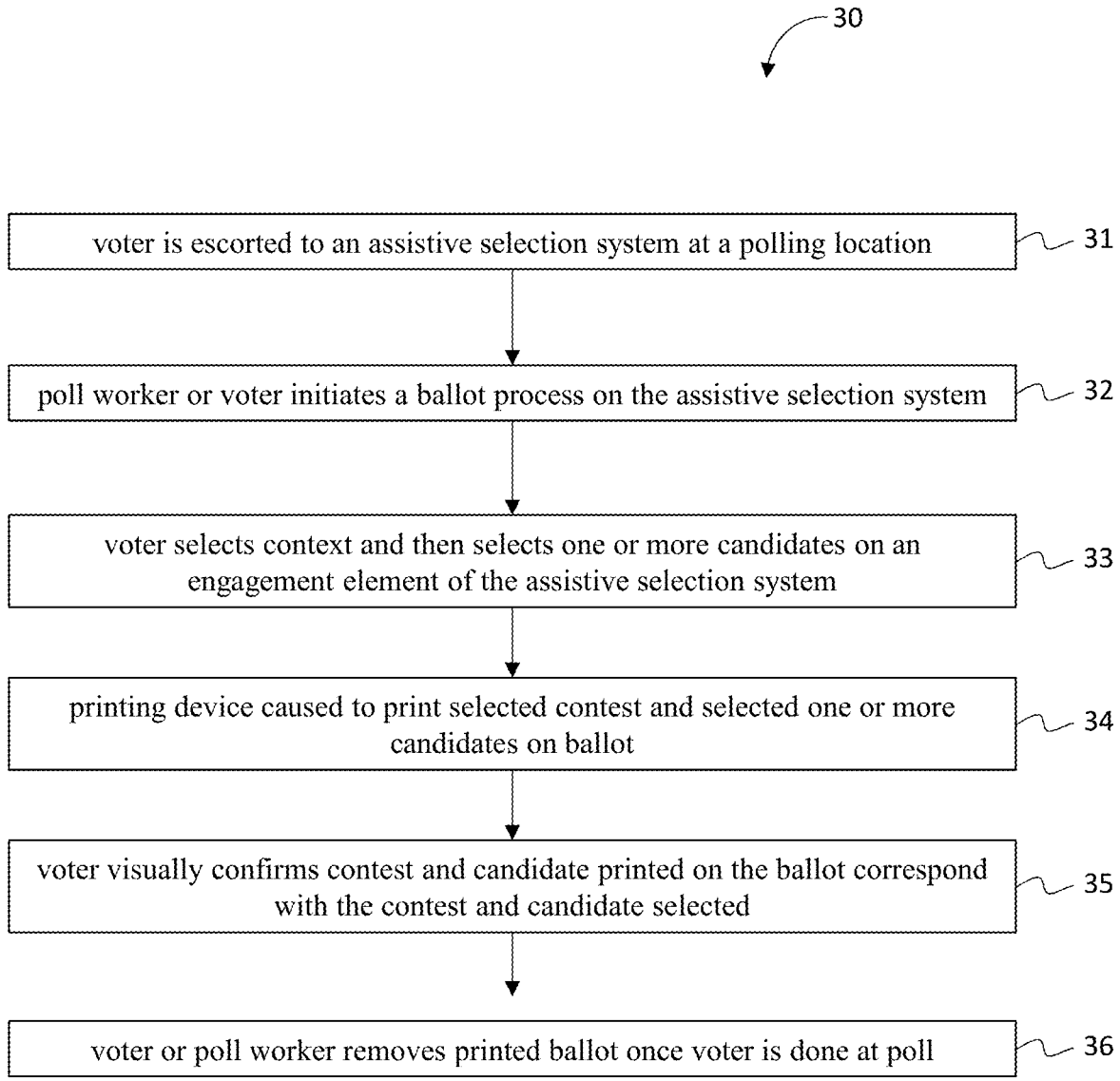
Figure 5:
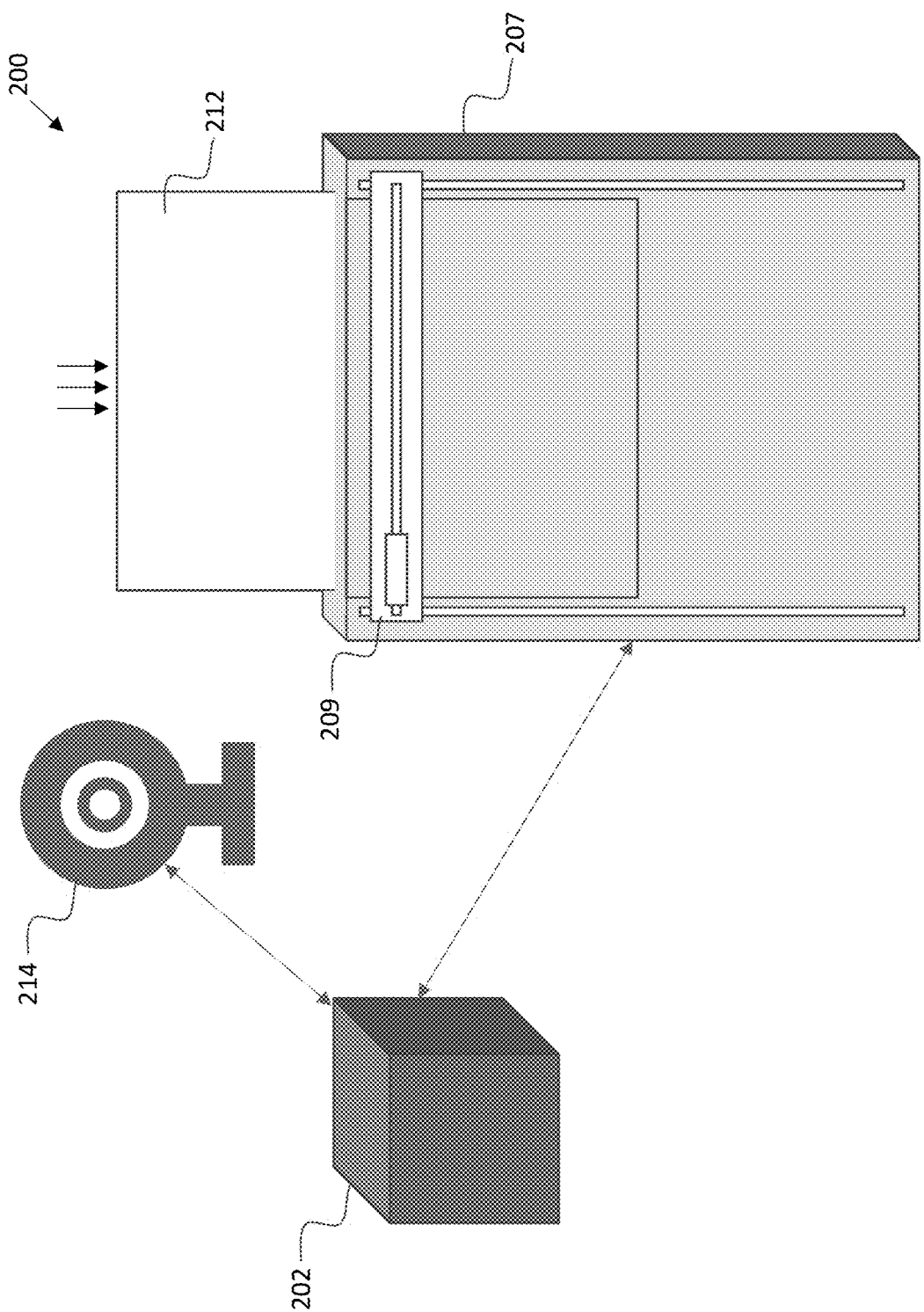
Figure 6:
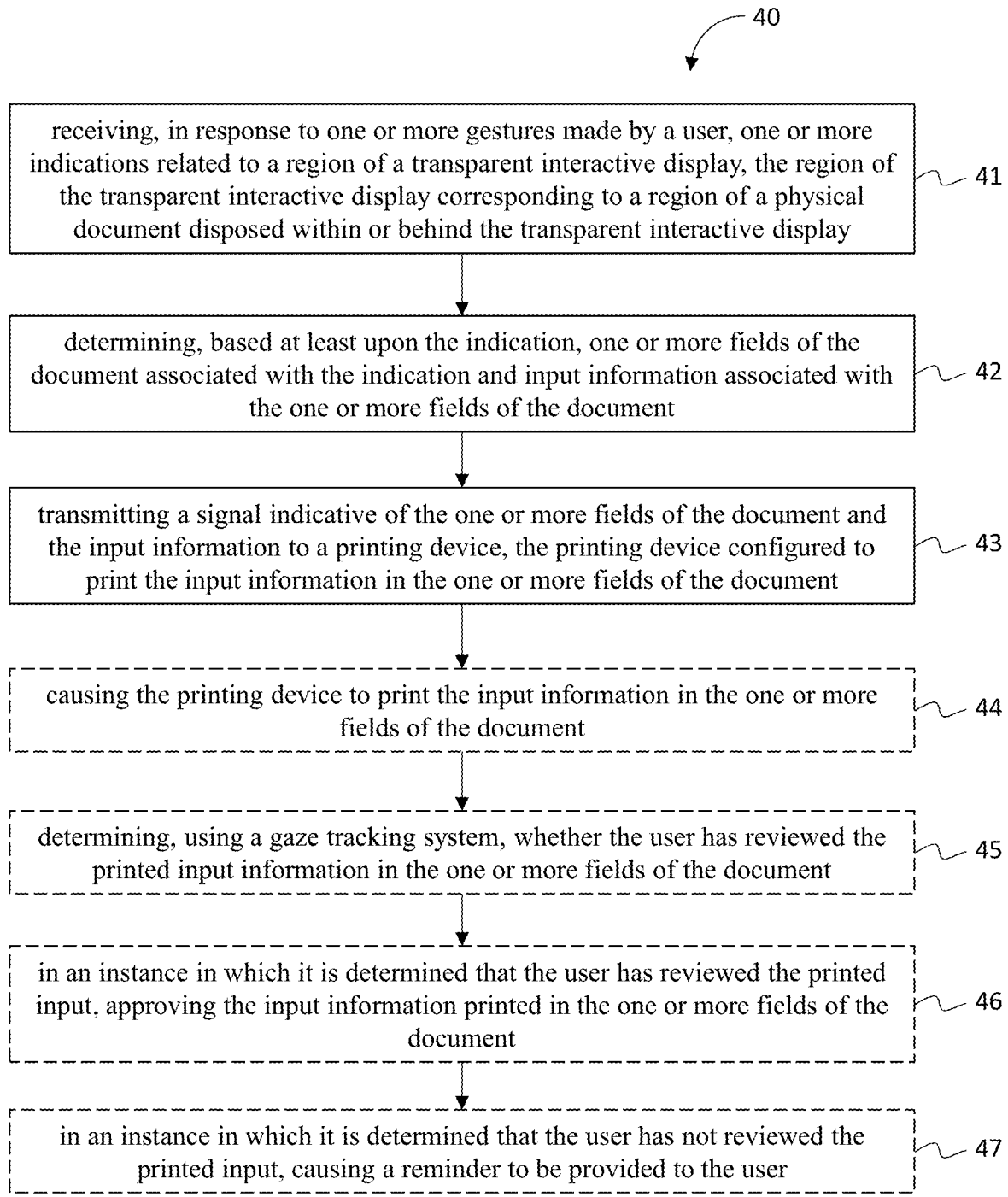

Having thus described the invention in general terms, reference will now be made to the accompanying drawings, which are not necessarily drawn to scale, and wherein:

FIG. 1 provides an example of an architecture that can be used to practice embodiments of the present invention;

FIG. 2 provides a flow diagram of an example computer-implemented process for assisting a user in transparently printing selections and/or information onto a document, in accordance with some embodiments discussed herein;

FIGS. 3A-3C provide an illustration of an approach for using a document retention device as part of an assistive-selection system, in accordance with some embodiments discussed herein;

FIG. 4 provides a flow diagram of an example process for assisting a voter with filling out a ballot using an assistive-selection system, in accordance with some embodiments discussed herein;

FIG. 5 provides an example of an architecture that can be used to practice embodiments of the present invention; and FIG. 6 provides a flow diagram of an example process for assisting a user with filling out one or more fields of a document using an assistive-selection system, in accordance with some embodiments discussed herein.

DETAILED DESCRIPTION

Various embodiments of the present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

Embodiments of the present invention may be implemented in various ways, including as computer in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media may include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also may include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also may include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also may include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

FIG. 1 provides an overview of a system 100 that can be used to practice embodiments of the present invention. In some embodiments, the system 100 can include an assistive-selection system 101 comprising a computing entity 102 operably coupled to a document retention device 107 and a printing device 109. In some embodiments, the computing entity 102 can comprise a processor 103, a memory 104, and a computer program code 105 stored on the memory 104. In some embodiments, the computing entity 102 can comprise a display 106 such that a user can view, modify, delete, and/or input data to the computing entity 102.

In some embodiments, the document retention device 107 can comprise a transparent interface 108A and/or an engagement element 108B. In some embodiments, the document retention device 107 and/or a component thereof can be in operable communication with the computing entity 102 and/or the printing device 109. In some embodiments, the document retention device 107 can comprise a transparent interface 108A and an engagement element 108B, and the document retention device 107 can be operably coupled to the computing entity 102 and the printing device 109. In some embodiments, the document retention device 107 can be operably coupled to the computing entity 102, the computing entity 102 comprising the transparent interface 108A and/or the engagement element 108B, and the computing entity 102 and the document retention device 107 can be operably coupled to the printing device 109. In some embodiments, the computing entity 102, document retention device 107, transparent interface 108A, engagement element 108B, and printing device 109 can be integrated into a single apparatus or device. In some embodiments, the transparent interface 108A can be integrated with or a component of the engagement element 108B. In some embodiments, the document retention device 107 can be configured to retain a document or any suitable material for recording an input from a user. In some embodiments, the document retention device 107 can be configured to retain a ballot or other such voting material during selection of ballot selections by the user. For instance, the document retention device 107 can be configured to retain a document such that the document is viewable through the transparent interface 108A. In some embodiments, such as when the engagement element 108B is integrated into the transparent interface 108A, a document may be retained within an inner volume or space of the document retention device 107 such that the document is viewable through the transparent interface 108A and such that the user can interact with the engagement element 108B in relation to or to cause a change to the document via the engagement element 108B. By way of example only, a user can engage with the engagement element 108B of the document retention device 107, which may cause another device such as the printing device 109, to make a change to or mark upon the document.

In some embodiments, the computing entity 102 or a component thereof can be configured to communicate with the engagement element 108B such that the user can provide instructions, inputs, data, gestures, or another indication indicative of a command to be carried out by another component or element such as the printing device 109. The another way, in some embodiments, the user can make a translational gesture or the like while engaging the engagement element 108B to indicate a selection of a field or an option from a drop-down menu, for instance, on the transparent interface 108A and/or the display 106.

In some embodiments, the computing entity 102 or a component thereof can be configured to communicate with the printing device 109 to provide instructions and/or data to the printing device 109. In some embodiments, such as in response to instructions, a gesture, and/or another such command from a user, the computing entity 102 or a component thereof can provide a signal or otherwise provide a commend to the printing device 109 for the printing device 109 to mark the document disposed adjacent the transparent interface 108A.

In some embodiments, the assistive-selection system 101 interacts with one or more external networks 110 over a communication network (not shown). The communication network may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

In some embodiments, the processor 103 may include one or more microprocessors, central processors, main processors, arithmetic logic units, integrated circuit chips, one or more complex programmable logic devices (CPLDs), multi-core processors, coprocessing entities, application-specific instruction-set processors (ASIPs), microcontrollers, and/or controllers. Further, the processor 103 may be embodied as one or more other processing devices or circuitry. The term circuitry may refer to an entirely hardware embodiment or a combination of hardware and computer program products. Thus, the processor 103 may be embodied as integrated circuits, application specific integrated circuits (ASICs), field programmable gate arrays (FPGAs), programmable logic arrays (PLAs), hardware accelerators, other circuitry, and/or the like.

In some embodiments, the memory 104 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

In some embodiments, the document can be any form, written or printed article, textual file, ballot, poll, voting file, election document, survey, manuscript, bill, deed, informational form, or any other such physical article to which a mark can be made or information affected. In some embodiments, the document can be editable by addition to, modification of, or subtraction from the document. In some embodiments, the document may comprise or define one or more fields where information or an indication of selection can be marked or otherwise recorded. For instance, in an embodiment in which the document is a ballot for election of a public official, a first field can relate to a first candidate and a second field can relate to a second candidate, the document being configured to be marked in response to a user indication of a candidate. In some embodiments, a user can indicate the first candidate by selecting the first candidate on the engagement element 108B with their finger or a stylist.

In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, settop boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in some embodiments, the computing entity 102 may also include one or more communications interfaces (not shown) for communicating with various computing entities, such as by communicating data, content, information, and/or similar terms used herein interchangeably that can be transmitted, received, operated on, processed, displayed, stored, and/or the like.

In some embodiments, the computing entity 102 may include or be in communication with one or more processing elements (not shown; also referred to as processors, processing circuitry, and/or similar terms used herein interchangeably) that communicate with other elements within the computing entity 102 via a bus, for example. As will be understood, the processing element may be embodied in a number of different ways. For example, the processing element may be embodied as one or more complex programmable logic devices (CPLDs), microprocessors, multicore processors, coprocessing entities, application-specific instruction-set processors (ASIPs), microcontrollers, and/or controllers. Further, the processing element may be embodied as one or more other processing devices or circuitry. The term circuitry may refer to an entirely hardware embodiment or a combination of hardware and computer program products. Thus, the processing element may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element may be configured for a particular use or configured to execute instructions stored in volatile or non-volatile media or otherwise accessible to the processing element. As such, whether configured by hardware or computer program products, or by a combination thereof, the processing element may be capable of performing steps or operations according to embodiments of the present invention when configured accordingly.

In one embodiment, the computing entity 102 may further may include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media (not shown), including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity—relationship model, object model, document model, semantic model, graph model, and/or the like.

In one embodiment, the computing entity 102 may further may include or be in communication with volatile media (also referred to as volatile storage, memory, memory storage, memory circuitry and/or similar terms used herein interchangeably). In one embodiment, the volatile storage or memory may also may include one or more volatile storage or memory media, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element. Thus, the databases, database instances, database management systems, data, applications, programs, program modules, scripts, source code, object code, byte code, compiled code, interpreted code, machine code, executable instructions, and/or the like may be used to control certain aspects of the operation of the computing entity 102 with the assistance of the processing element and operating system.

As indicated, in one embodiment, the computing entity 102 may also may include one or more communications interfaces (not shown) for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 102 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultrawideband (UWB), infrared (IR) protocols, near field communication (NFC) protocols, Wibree, Bluetooth protocols, wireless universal serial bus (USB) protocols, and/or any other wireless protocol.

Although not shown, the computing entity 102 may include or be in communication with one or more input elements, such as a keyboard input, a mouse input, a touch screen/display input, motion input, movement input, audio input, pointing device input, joystick input, keypad input, and/or the like. The computing entity 102 may also may include or be in communication with one or more output elements (not shown), such as audio output, video output, screen/display output, motion output, movement output, and/or the like.

In some embodiments, the transparent interface 108A and the engagement element 108B can be components of a transparent interactive display, such as the document retention device 10. In some embodiments, the document retention device 107 can include a first surface spaced a distance from a second surface and defining an inner space. In some embodiments, the surfaces of the document retention device 107 can be configured to retain a document or other such material within the inner space. In some embodiments, the first surface can be at least partially transparent or translucent such that a document disposed within the inner space of the document retention device 107 can be visible therethrough. In some embodiments, the first surface can also comprise an interactive portion, such as the engagement element 108B, that can be digitally engaged, gesturally engaged, operably engaged, or otherwise engaged such that a command, indication, information, or the like can be input to, indicated to, communicated to, or transmitted to the interactive portion. In other words, a document can be disposed, e.g., slidably disposed, into the inner space of the document retention device 107, the user can make a selection or input information via the engagement element 108B or other similar components, and the document retention device 107 can cause the selection or information to be printed on or input to the document, such as via the printing device 109.

In some embodiments, the computing entity 102 can be operably coupled to the printing device 109 such that the computing entity 102 can cause the printing device 109 to print a selection or information onto the document, such as in a particular field of the document. In some embodiments, the printing device 109 can be caused to print a first selection or a first information onto the document after the user makes the first selection or inputs the first information via the engagement element 108B, such as within a predetermined time of the user making the first selection or inputting the first information, the user subsequently makes a second selection or inputs second information, and the printing device 109 can be caused to print the second selection or the second information to the document in response to the user making the second selection or inputting the second information. In other words, the printing device 109 can be caused to print input selections or information in real-time or near real-time following the user inputting the information or making the selection. In some embodiments, the printing device 109 can be caused to print after two or more selections or inputs from the user. In other words, in some embodiments, the printing device 109 can be caused to print after every selection or input from the user or can wait until multiple selections or inputs from the user before printing all selections or inputs on the document. In some embodiments, the computing entity 102 can be configured to cause the printing device 109 to print selections or information onto the document based on inputs or selections made by the user through operable engagement of the engagement element 108B.

In some embodiments, the printing device 109 can be interoperable with the document retention device 107 such that the user can engage the engagement element 108B or other such components of the assistive-selection system 101 without disruption of the printing being carried out by the printing device 109. In some embodiments, the printing device 109 can be configured to print onto or otherwise mark the document while the document remains disposed to the inner space defined by at least the first and second surfaces of the document retention device 107. In some embodiments, the printing device 109 can be at least partly disposed within the inner space of the document retention device 107. In some embodiments, the printing device 109 can be coupled to or at least partly disposed within the first surface of the document retention device 107. In some embodiments, the engagement element 108B can be disposed on or an integral part of a third surface of the document retention device 107 opposite the first surface. In some embodiments, the first surface can be the transparent interface 108A and the third surface can be the engagement element 108B.

In some embodiments, the engagement element 108B (such as the transparent interactive display) can be configured to display information such as one or more fields, ballot information, bar codes, serial numbers, demographic information related to the user, information related to the document and one or more selections that can be made by marking the document, or the like. In some embodiments, the engagement element 108B can be configured to present an augmented reality representation of at least a portion of the document or another similar representation to the user. In some embodiments, the transparent interactive display or engagement element 108B can comprise a transparent or partially transparent liquid crystal display (LCD) screen, a transparent or partially transparent organic light emitting diode (OLED) screen, or the like. In some embodiments, the transparent or partially transparent screen can comprise a resistive substrate operable to detect voltage changes due to a user engaging the resistive substrate with a finger, stylist, or the like. In some embodiments, the transparent or partially transparent screen can comprise a surface acoustic wave substrate operable to detect changes, due to a user engaging the resistive substrate with a finger, stylist, or the like, to an ultrasonic or acoustic wave being passed across the substrate. In some embodiments, the transparent or partially transparent screen can comprise a capacitive substrate operable to detect changes, due to a user engaging the resistive substrate with a finger, stylist, or the like, to an electrostatic field, measured as a change in capacitance, of the resistive substrate. In some embodiments, the transparent or partially transparent screen can comprise a infrared grid operable to detect disruptions to a pattern of LED beams receivable by photodetectors, due to a user engaging the infrared grid with a finger, stylist, or the like. In some embodiments, the transparent or partially transparent screen can comprise an infrared acrylic projection touchscreen, an optical imaging touchscreen, an optical imaging touchscreen, a dispersive signal technology, an acoustic pulse recognition, or another such equipment or device.

In some embodiments, the engagement element 108B can be operably coupled to the computing entity 102 or a component thereof, e.g., the processor 103, such that when the user engages the engagement element 108B, the engagement element 108B can transmit information indicative of the user's engagement of the engagement element 108B to the computing entity 102 or a component thereof. In some embodiments, the memory 104 can be configured to, with the processor 103 and using the computer program code 105, receive an indication that a user has engaged the engagement element 108B in a particular area or portion, or in a particular manner. In other words, the engagement element 108B or another such component of the document retention device 107 can be configured such that the user can make a selection on a form or document or print information onto the form or document by operably engaging the engagement element 108B or other such component. In some embodiments, the user can operably engage the engagement element 108B by touching the engagement element 108B with one or more fingers, a stylus, marking tool, pen, active pen, positional pen, capacitive pen, or the like. In some embodiments, engagement of the engagement element 108B or another such component by the user can cause generation of a touch control signal, and the touch control signal can be sent to the computing entity 102 or a component thereof. In some embodiments, upon receiving the touch control signal associated with the user's engagement of the engagement element 108B, the computing entity 102 can cause the printing device 109 to print an appropriate corresponding selection or information onto the document.

In some embodiments, the document can be subdivided into one, two or more portions and one or more fields in which a selection can be made and/or information input. For instance, in some embodiments, the document can be a ballot for a first election or contest and a second election or contest, and the document can comprise a first field associated with the first election or contest and a second field associated with the second election or contest. In some embodiments, the document can be associated with a plurality of contests, such as two, three, four, five, or more contests. In some embodiments, each of the plurality of contests can comprise one or more candidates, such as two, three, four, five or more candidates, from which the user can select at least one candidate. In some embodiments, the user can engage the engagement element 108B in a particular location or region or portion associated with a particular candidate of the plurality of candidates in order to select the particular candidate, and the engagement by the user can cause the engagement element 108B to generate and transmit the touch control signal or the like to the computing entity 102 or a component thereof, the computer entity 102 or component thereof configured to interpret the touch control signal and to interpret the user's selection based upon the user's engagement of the engagement element 108B and to cause the printing device 109 to mark the user's selection for the particular contest on the document in the field associated with that particular contest.

In some embodiments, the document can be subdivided by markings or other indicia present on the document or by relative spatial assignments of subdivisions and corresponding regions determined by the computing entity 102 or a component thereof. In other words, in some embodiments the document initially comprises one or more contests and corresponding fields for the user to select a candidate, input a candidate, or otherwise indicate the user's selection for the corresponding contest, and user selection of a candidate can cause the printing device 109 or other suitable device to mark or print the user's selection into the corresponding field of the document. In other embodiments, the document can be initially blank and as the user selects a contest and subsequently indicates their selected candidate for the selected contest, the computing entity 102 can be configured to cause the printing device 109 or other suitable device to mark, print, or otherwise indicate the selected context and selected candidate for the selected contest on the document. The another way, the user touches or otherwise indicates a contest and/or indicates a selected candidate, the computing entity 102 interprets the user's touch engagement of the engagement element 108B and sends a signal indicative of a printing or other such marking command to the printing device 109, and the printing device 109 is caused to print the contest and/or the selected candidate on the document, such as in a designated field, region, or portion of the document.

In some embodiments, the computing entity 102 may be configured to perform a process 20 in accordance with the various steps/operations depicted in FIG. 2. The process 20 depicted in FIG. 2 comprises receiving, by the computing entity 102, in response to a gesture or other such engagement or input by a user, an indication related to a region of a transparent interactive display, at 21. In some embodiments, the region of the interactive display can correspond to a region of a document that is viewable by the user and corresponds, e.g., spatially, to the transparent interactive display. In some embodiments, the document can be viewable by the user through the transparent interactive display.

The process 20 is further depicted in FIG. 2 as comprising determining, using the computing entity 102, based at least upon the indication, one or more fields of the document associated with the indication and input information associated with the one or more fields of the document, at 22. In other words, the computing entity 102 can be configured to review a document, e.g., a document disposed adjacent the transparent interactive display on a side opposite the user, identify one or more regions of the document and/or one or more fields on the document, and determine what information can be input to the fields. For instance, in some embodiments, the computing entity 102 can determine the contents of the document based upon any information contained on the document, based upon an indication or gesture or the like from the voter, and/or based upon metadata associated with the document and provided to and/or received by the computing entity 102.

The process 20 is further depicted in FIG. 2 as comprising transmitting, using the computing entity 102, a signal indicative of the one or more fields of the document and the input information to a printing device, at 23. In some embodiments, the computing entity 102 can also transmit input information to a printing device. In some embodiments, the printing device can be configured to print the input information in the one or more fields of the document.

The process 20 is further depicted in FIG. 2 as, optionally, comprising causing, using the computing entity 102, the printing device to print the input information in the one or more fields of the document, at 24.

As illustrated in FIGS. 3A-3C, the document retention device 107 is illustrated, according to an embodiment of the present invention. In some embodiments, the document retention device 107 can be configured such that a document such as described herein can be disposed within an inner space of the document retention device 107. In some embodiments, the document can be slidably disposed within the inner space such that a front side of the document is visible through the engagement element 108B and retained within the inner space at least in part by the transparent interface 108A and/or the engagement element 108B. In some embodiments, such as illustrated in FIG. 4, the transparent interface 108A and/or the engagement element 108B can be caused to present information viewable by the user, such as information related to a survey, ballot, application, or the like. By way of example only, in some embodiments, the computing entity 102 can communicate information related to the document to the transparent interface 108A and/or the engagement element 108B and the transparent interface 108A and/or the engagement element 108B can be caused to present the information to the user in visual form. In some embodiments, the information can comprise one or more fields such as a particular electoral contest or the like, and the user can select a contest by engaging the transparent interface 108A and/or the engagement element 108B the transparent interface 108A and/or the engagement element 108B in a region or area associated with the contest. By way of example only, as illustrated in FIG. 3B, the user can select a U.S. Senate contest by touching with their finger the region of the transparent interface 108A and/or the engagement element 108B associated with the U.S. Senate contest, which can cause the transparent interface 108A and/or the engagement element 108B to transmit a signal to the computing entity 102 indicative of the user's touch selection of the U.S. Senate contest. The computing entity 102 can then transmit information about the candidate for the selected contest to the transparent interface 108A and/or the engagement element 108B and the transparent interface 108A and/or the engagement element 108B can be caused to present the candidates associated with the contest on the transparent interface 108A and/or the engagement element 108B. The user can then select one or more of the candidates associated with the selected contest, which causes the transparent interface 108A and/or the engagement element 108B to transmit the user's subsequent selection of the one or more candidates to the computing entity 102, the computing entity 102 then causing the printing device 109 to print or otherwise mark the document with the user's candidate selection and/or the associated contest, as illustrated in FIG. 3C.

Referring now to FIG. 4, a process 30 for assisting a user in voting at a polling location can be carried out with the use of the system 100 comprising the assistive-selection system 101. In some embodiments, the process 30 can comprise a voter being escorted to an assistive-selection system 101 at a polling location, at 31. In some embodiments, the process 30 can further comprise the user or a poll worker at the polling location initiating a ballot process, such as a software program or the like, on the assistive-selection system 101, at 32. In some embodiments, the process 30 can further comprise a voter selecting a contest and then selecting one or more candidates on the engagement element 108B of the assistive-selection system 101, at 33. In some embodiments, the process 30 can further comprise printing, using the printing device 109, the selected contest and selected one or more candidates on the ballot (e.g., the document), at 34. In some embodiments, the process 30 can further comprise the voter visually confirming that the contest and candidate printed on the ballot properly correspond to the contest and candidate the user previously selected, at 35. In some embodiments, in an instance in which the voter determines that the contest and/or candidate printed on the ballot do not correspond with the contest and candidate selected by the user, the user can indicate the same to the poll worker and/or indicate the same through engagement of the assistive-selection system 101 so as to discontinue polling using the current ballot and restart the process 30 with a new ballot. In some embodiments, in an instance in which the voter determines that the contest and/or candidate printed on the ballot does correspond with the contest and candidate selected by the user, the user can engage the assistive-selection system 101 or a component thereof to indicate another contest and/or candidate until the voting process is complete and the voter is satisfied that one or more of the candidates for each contest has been properly selected as desired by the voter, as illustrated by the arrow between box 35 and box 33 in FIG. 4. In some embodiments, the process 30 can further comprise, once the voter is satisfied that the printed ballot accurately reflects their desired selections for each contest available to the voter, the voter or poll worker removing the printed ballot from the assistive-selection system 101, carrying out other processes or procedures as required to complete the voting process, and securing the ballot in paper form.

In some embodiments, the assistive-selection system, such as the assistive-selection system 101 described herein can be configured such that the user's (e.g., the voter's) selections and/or information indicated on the document through marking of the document, can be stored digitally as voter selection information, for example on a memory device such as the memory 104. In some embodiments, the assistive-selection system 101 can be further configured to communicate with and/or transmit voter selection information or the like to the one or more external networks 110 such that voter selection information from disparate polling locations can be collated to a central server or other suitable storage and processing center. In some embodiments, the assistive-selection system 101 can further comprise imaging and/or camera devices suitable to capture an image of the document once the user has input all selections and/or printed any suitable information on the document such that a digital image of the finished document can be stored and/or transmitted, such as by the computing entity 102 or a component thereof.

Referring now to FIG. 5, a system 200 can be provided that comprises a computing entity 202, a document retention device 207, a printing device 209 configured to print ink onto a physical document 212, and a gaze tracking system 214. The computing entity 202 can be similar to or the same as the computing entity 102 described above with regard to FIG. 1. Likewise, the document retention device 207 can be similar to or the same as the document retention device 107 described above with regard to FIG. 1. Furthermore, the printing device 209 can be similar to or the same as the printing device 109 described above with regard to FIG. 1. As such, at least some elements, features, and functions of the computing entity 202, document retention device 207, and printing device 209 are not described in further detail herein, and should be considered identical or substantially similar, respectively, to the computing entity 102, document retention device 107, and printing device 109 unless explicitly described differently.

In some embodiments, the gaze tracking system 214 can be used to verify that the user, e.g., a voter, has viewed the information printed on the physical document 212, e.g., ballot. According to some embodiments of the system 200, the document retention device 207 can comprise a transparent interactive printing interface (TIPI). In some embodiments, the printing device 209 can be positioned behind the TIPI. In some embodiments, the gaze tracking system 214 can be positioned in front of the user nearby, on, behind, or in front of the TIPI. In some embodiments, the gaze tracking system 214 can capture images of the face of the user/voter. In some embodiments, the gaze tracking system 214 can comprise one or more cameras configured to capture the images of the user's face. In some embodiments, the gaze tracking system 214 can comprise one or more processors (not shown) and/or can be in communication with the computing entity 202 for purposes of processing the images and determining a direction of viewing by the user. In some embodiments, the gaze tracking system 214 can comprise an application programming interface (API) that stores computer instructions, code, software, an application, or the like that tracks the user's eyes. In some embodiments, the gaze tracking system 214 can comprise an API that is configured to interpret or determine a direction of viewing by the user and thereby control movement of a mouse or other pointer on the TIPI using movements and direction of viewing of the user's eyes. Said otherwise, wherever the user looks, the mouse will follow, such that the user can shift their gaze in order to cause translational motion of the mouse across the display, TIPI, or the like.

In some embodiments, one or more fields on a document held within or behind the TIPI interface can be selected using the gaze tracking system or another such gesture or touch by the user. For example, the user can touch the screen to make their field or drop-down list selections. In some embodiments, once the user makes their selection, the screen can fade and the selections are then printed on the physical document beneath the TIPI. In some embodiments, a delineation of a portion of the document can be made, such as by placing an invisible rectangle or other suitable outline around the printed selections on the screen or TIPI. In some embodiments, when the user looks at the printed selections, the gaze tracking system 214 can cause the mouse to follow the user's gaze over to the rectangle. In some embodiments, the rectangle can be flagged or otherwise configured as an active event listener for OnMouseOver. Said otherwise, when the mouse goes over the rectangle, it will call up a function, which may be called a OnMouseOverFunction. In some embodiments, the OnMouseOverFunction will make the rectangle visible with a more overt border, e.g., a Black border. In some embodiments, an OnMouseClick listener function can then be assigned to the more overt rectangle now that it is now visible to the user. Then, the OnMouseOverFunction can also show text below the rectangle instructing the user/voter to touch the screen or display to indicate their selection. When the user/voter touches the rectangle that is over their selections, the OnMouseClickFunction is called up, which will cause the printing device 209 to print the selections. In some embodiments, a document can be presented to the user in any number of portions, such as in third. In other words, a first delineation, such as an invisible triangle, can be placed about a first third of the document and the user can make their selections or enter their information. Then, after the first or second third of the document prints to the document, the screen can fade again, the rectangle can become invisible again for the second or third portion of the document, and the OnMouseOver listener is activated for the fields within the delineated portion of the document. This process will repeat until the user, e.g., voter has printed the entire document, e.g., ballot.

Referring now to FIG. 6, a method 40 can be carried out, for instance using all or a portion of the system 200. The method 40 can comprise receiving, in response to one or more gestures made by a user, one or more indications related to a region of a transparent interactive display, the region of the transparent interactive display corresponding to a region of a physical document disposed within or behind the transparent interactive display, at 41. In some embodiments, the method 40 can further comprise determining, based at least upon the indication, one or more fields of the document associated with the indication and input information associated with the one or more fields of the document, at 42. In some embodiments, the method 40 can further comprise transmitting a signal indicative of the one or more fields of the document and the input information to a printing device, the printing device configured to print the input information in the one or more fields of the document, at 43. In some embodiments, the method 40 can, optionally, further comprise causing the printing device to print the input information in the one or more fields of the document, at 44. In some embodiments, the method 40 can, optionally, further comprise determining, using a gaze tracking system, whether the user has reviewed the printed input information in the one or more fields of the document, at 45. In some embodiments, the method 40 can, optionally, further comprise in an instance in which it is determined that the user has reviewed the printed input, approving the input information printed in the one or more fields of the document, at 46. In some embodiments, the method 40 can, optionally, further comprise in an instance in which it is determined that the user has not reviewed the printed input, causing a reminder to be provided to the user.

Provided herein are systems, methods, apparatuses, computer program products, and systems for transparent, interactive printing interfaces for ballot-processing. Certain embodiments utilize systems, methods, and computer program products that enable a user to select a ballot decision for a particular field on the transparent interactive printing interface, resulting in real-time printing on a paper ballot or the like positioned behind the transparent interactive printing interface.

In accordance with some embodiments, a method is provided. In one embodiment, the method can be a computer-implemented method comprising receiving, in response to a gesture by a user, an indication related to a region of a transparent interactive display, the region of the transparent interactive display corresponding to a region of a document viewable by the user through the transparent interactive display. In some embodiments, the computer-implemented method can further comprise determining, based at least upon the indication, one or more fields of the document associated with the indication and input information associated with the one or more fields of the document. In some embodiments, the computer-implemented method can further comprise transmitting a signal indicative of the one or more fields of the document and the input information to a printing device, the printing device configured to print the input information in the one or more fields of the document. In some embodiments, the document can be one of a voting ballot, a survey, an application, a poll, a canvass, an assessment, a declaration, a written oath, a form, a bill, a check, a statement, a deed, a manuscript, and a certificate. In some embodiments, the computer-implemented method can further comprise causing the printing device to print the input information in the one or more fields of the document.

In accordance with other embodiments, a computer program product is provided. The computer program product may comprise at least one computer-readable storage medium having computer-readable program code portions stored therein, the computer-readable program code portions comprising executable portions configured to carry out a process, such as a computer-implemented method. In some embodiments, the computer program product can comprise a non-transitory computer storage medium comprising instructions configured to cause one or more processors to at least perform receiving, in response to a gesture by a user, an indication related to a region of a transparent interactive display, the region of the transparent interactive display corresponding to a region of a document viewable by the user through the transparent interactive display. In some embodiments, the computer program product can comprise a non-transitory computer storage medium comprising instructions configured to cause one or more processors to at least perform determining, based at least upon the indication, one or more fields of the document associated with the indication and input information associated with the one or more fields of the document. In some embodiments, the computer program product can comprise a non-transitory computer storage medium comprising instructions configured to cause one or more processors to at least perform transmitting a signal indicative of the one or more fields of the document and the input information to a printing device, the printing device configured to print the input information in the one or more fields of the document. In some embodiments, the document is one of a voting ballot, a survey, an application, a poll, a canvass, an assessment, a declaration, a written oath, a form, a bill, a check, a statement, a deed, a manuscript, and a certificate. In some embodiments, the computer program product can comprise a non-transitory computer storage medium comprising instructions configured to cause one or more processors to at least perform causing the printing device to print the input information in the one or more fields of the document.

In accordance with yet other embodiments, an apparatus comprising a transparent, interactive interface operably coupled to a printing device and configured to retain a printing substrate within or behind the transparent, interactive interface is provided. In one embodiment, the apparatus may be configured to carry out a computer-implemented method. In some embodiments, the apparatus can be configured to carry out a computer-implemented method comprising receiving, in response to a gesture by a user, an indication related to a region of a transparent interactive display, the region of the transparent interactive display corresponding to a region of a document viewable by the user through the transparent interactive display. In some embodiments, the apparatus can be configured to carry out a computer-implemented method further comprising determining, based at least upon the indication, one or more fields of the document associated with the indication and input information associated with the one or more fields of the document. In some embodiments, the apparatus can be configured to carry out a computer-implemented method further comprising transmitting a signal indicative of the one or more fields of the document and the input information to a printing device, the printing device configured to print the input information in the one or more fields of the document. In some embodiments, the document can be one of a voting ballot, a survey, an application, a poll, a canvass, an assessment, a declaration, a written oath, a form, a bill, a check, a statement, a deed, a manuscript, and a certificate. In some embodiments, the apparatus can be further configured to carry out a computer-implemented method further comprising causing the printing device to print the input information in the one or more fields of the document.

In accordance with still other embodiments, an apparatus can comprise means, such as at least one processor and at least one memory including computer program code, for carrying out a computer-implemented method. In some embodiments, the apparatus can comprise means for receiving, in response to a gesture by a user, an indication related to a region of a transparent interactive display, the region of the transparent interactive display corresponding to a region of a document viewable by the user through the transparent interactive display. In some embodiments, the apparatus can further comprise means for determining, based at least upon the indication, one or more fields of the document associated with the indication and input information associated with the one or more fields of the document. In some embodiments, the apparatus can further comprise means for transmitting a signal indicative of the one or more fields of the document and the input information to a printing device, the printing device configured to print the input information in the one or more fields of the document. In some embodiments, the document can be one of a voting ballot, a survey, an application, a poll, a canvass, an assessment, a declaration, a written oath, a form, a bill, a check, a statement, a deed, a manuscript, and a certificate. In some embodiments, the apparatus can further comprise means for causing the printing device to print the input information in the one or more fields of the document.

In accordance with still another embodiment, a method can be carried out that comprises: receiving, in response to one or more gestures made by a user, one or more indications related to a region of a transparent interactive display, the region of the transparent interactive display corresponding to a region of a physical document disposed within or behind the transparent interactive display; determining, based at least upon the indication, one or more fields of the document associated with the indication and input information associated with the one or more fields of the document; and transmitting a signal indicative of the one or more fields of the document and the input information to a printing device, the printing device configured to print the input information in the one or more fields of the document. In some embodiments, the document is one of a voting ballot, a survey, an application, a poll, a canvass, an assessment, a declaration, a written oath, a form, a bill, a check, a statement, a deed, a manuscript, and a certificate. In some embodiments, the region of the physical document is viewable by the user through the transparent interactive display. In some embodiments, the method can further comprise: causing the printing device to print the input information in the one or more fields of the document. In some embodiments, the method can further comprise: receiving, in response to a second gesture made by the user, a second indication related to a second region of the transparent interactive display; determining, based at least upon the second indication, one or more second fields of the document associated with the second indication and second input information associated with the one or more second fields of the document; and transmitting a second signal indicative of the one or more second fields of the document and the second input information to the printing device, thereby causing the printing device to print the second input information in the one or more second fields of the document. In some embodiments, the transparent interactive display comprises a touch-sensitive display. In some embodiments, the one or more gestures made by the user comprise a touch, a tap, a swipe, or a translational motion by a finger of the user on the touch-sensitive display. In some embodiments, the method can further comprise: determining, using a gaze tracking system, whether the user has reviewed the printed input information in the one or more fields of the document; in an instance in which it is determined that the user has reviewed the printed input, approving the input information printed in the one or more fields of the document; and/or, in an instance in which it is determined that the user has not reviewed the printed input, causing a reminder to be provided to the user. In some embodiments, the gaze tracking system comprises one or more cameras configured to capture images of the user's face, and one or more processors configured to determine a direction of viewing based at least upon the images of the user's face and determine if the direction of viewing corresponds to the one or more fields of the document.

According to yet another embodiment, an apparatus can be provided that comprises: at least one processor; and at least one non-transitory memory comprising program code, wherein the at least one non-transitory memory and the program code are configured to, with the at least one processor, cause the apparatus to: receive, in response to a gesture by a user, an indication related to a region of a transparent interactive display, the region of the transparent interactive display corresponding to a region of a document viewable by the user through the transparent interactive display; determine, based at least upon the indication, one or more fields of the document associated with the indication and input information associated with the one or more fields of the document; and transmit a signal indicative of the one or more fields of the document and the input information to a printing device, the printing device configured to print the input information in the one or more fields of the document. In some embodiments, the document is one of: a voting ballot, a survey, an application, a poll, a canvass, an assessment, a declaration, a written oath, a form, a bill, a check, a statement, a deed, a manuscript, or a certificate. In some embodiments, the region of the physical document is viewable by the user through the transparent interactive display. In some embodiments, the at least one non-transitory memory and the program code are further configured to, with the at least one processor, cause the apparatus to: cause the printing device to print the input information in the one or more fields of the document. In some embodiments, the at least one non-transitory memory and the program code are further configured to, with the at least one processor, cause the apparatus to: receive, in response to a second gesture made by the user, a second indication related to a second region of the transparent interactive display; determine, based at least upon the second indication, one or more second fields of the document associated with the second indication and second input information associated with the one or more second fields of the document; and transmit a second signal indicative of the one or more second fields of the document and the second input information to the printing device, thereby causing the printing device to print the second input information in the one or more second fields of the document. In some embodiments, the transparent interactive display comprises a touch-sensitive display. In some embodiments, the one or more gestures made by the user comprise a touch, a tap, a swipe, or a translational motion by a finger of the user on the touch-sensitive display. In some embodiments, the at least one non-transitory memory and the program code are further configured to, with the at least one processor, cause the apparatus to: determine, using a gaze tracking system, whether the user has reviewed the printed input information in the one or more fields of the document; in an instance in which it is determined that the user has reviewed the printed input, approving the input information printed in the one or more fields of the document; and, in an instance in which it is determined that the user has not reviewed the printed input, causing a reminder to be provided to the user. In some embodiments, the gaze tracking system comprises one or more cameras configured to capture images of the user's face, and one or more processors configured to determine a direction of viewing based at least upon the images of the user's face and determine if the direction of viewing corresponds to the one or more fields of the document.

According to still another embodiment, a non-transitory computer storage medium can be provided that comprises instructions configured to cause one or more processors to at least at least perform: receiving, in response to one or more gestures made by a user, one or more indications related to a region of a transparent interactive display, the region of the transparent interactive display corresponding to a region of a physical document disposed within or behind the transparent interactive display; determining, based at least upon the indication, one or more fields of the document associated with the indication and input information associated with the one or more fields of the document; and transmitting a signal indicative of the one or more fields of the document and the input information to a printing device, the printing device configured to print the input information in the one or more fields of the document. In some embodiments, the non-transitory computer storage medium can further comprise instructions configured to cause the one or more processors to at least perform: causing the printing device to print the input information in the one or more fields of the document. In some embodiments, the non-transitory computer storage medium can further comprise instructions configured to cause the one or more processors to at least perform: determine, using a gaze tracking system, whether the user has reviewed the printed input information in the one or more fields of the document; in an instance in which it is determined that the user has reviewed the printed input, approve the input information printed in the one or more fields of the document; and, in an instance in which it is determined that the user has not reviewed the printed input, cause a reminder to be provided to the user. In some embodiments, the document is one of: a voting ballot, a survey, an application, a poll, a canvass, an assessment, a declaration, a written oath, a form, a bill, a check, a statement, a deed, a manuscript, or a certificate. In some embodiments, the region of the physical document is viewable by the user through the transparent interactive display. In some embodiments, the non-transitory computer storage medium can further comprise instructions configured to cause the one or more processors to at least perform: cause the printing device to print the input information in the one or more fields of the document. In some embodiments, the non-transitory computer storage medium can further comprise instructions configured to cause the one or more processors to at least perform: receive, in response to a second gesture made by the user, a second indication related to a second region of the transparent interactive display; determine, based at least upon the second indication, one or more second fields of the document associated with the second indication and second input information associated with the one or more second fields of the document; and transmit a second signal indicative of the one or more second fields of the document and the second input information to the printing device, thereby causing the printing device to print the second input information in the one or more second fields of the document. In some embodiments, the transparent interactive display comprises a touch-sensitive display. In some embodiments, the one or more gestures made by the user comprise a touch, a tap, a swipe, or a translational motion by a finger of the user on the touch-sensitive display. In some embodiments, the non-transitory computer storage medium can further comprise instructions configured to cause the one or more processors to at least perform: determine, using a gaze tracking system, whether the user has reviewed the printed input information in the one or more fields of the document; in an instance in which it is determined that the user has reviewed the printed input, approving the input information printed in the one or more fields of the document; and, in an instance in which it is determined that the user has not reviewed the printed input, causing a reminder to be provided to the user. In some embodiments, the gaze tracking system comprises one or more cameras configured to capture images of the user's face, and one or more processors configured to determine a direction of viewing based at least upon the images of the user's face and determine if the direction of viewing corresponds to the one or more fields of the document.

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

To provide an overall understanding, certain illustrative embodiments have been described; however, it will be understood by one of ordinary skill in the art that systems, apparatuses, and methods described herein can be adapted and modified to provide systems, apparatuses, and methods for other suitable applications and that other additions and modifications can be made without departing from the scope of systems, apparatuses, and methods described herein.

The embodiments described herein have been particularly shown and described, but it will be understood that various changes in form and details may be made. Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems or methods. Additionally, the shapes and sizes of components are also exemplary and unless otherwise specified, can be altered without affecting the scope of the disclosed and exemplary systems, apparatuses, or methods of the present disclosure.

Conventional terms in the field of computer science, electrical engineering, and software engineering have been used herein. The terms are known in the art and are provided only as a non-limiting example for convenience purposes. Accordingly, the interpretation of the corresponding terms in the claims, unless stated otherwise, is not limited to any particular definition. Thus, the terms used in the claims should be given their broadest reasonable interpretation.

Although specific embodiments have been illustrated and described herein, it will be appreciated by those of ordinary skill in the art that any arrangement that is adapted to achieve the same purpose may be substituted for the specific embodiments shown. Many adaptations will be apparent to those of ordinary skill in the art. Accordingly, this application is intended to cover any adaptations or variations.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements or any relative order of operations or organization on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure and is submitted with the understanding that it will not be used to interpret or limit the scope or meaning of the claims.

In this Detailed Description, various features may have been grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments may be combined with each other in various combinations or permutations. The scope of the embodiments should be determined with reference to the appended claims, along with the full scope of equivalents to which such claims are entitled.

The invention claimed is:

1. A method comprising:
causing presentation, in a first region of a transparent interactive display associated with a first region of a physical ballot disposed behind the transparent interactive display and viewable through the transparent interactive display, of a first set of candidate information or measure information associated with a first race or ballot measure;
determining, in response to one or more first user interactions with the transparent interactive display within the first region of the transparent interactive display, one or more selections being selected by a user from among the first set of candidate information or measure information;
transmitting a signal indicative of the one or more selections and instructions for printing the one or more selections within the first region of the physical ballot to a printing device, thereby causing the printing device to print, based at least on the signal, the one or more selections in the first region of the physical ballot;
once the printing device has printed the one or more selections on the physical ballot in said first region of the physical ballot, causing presentation of a confirmation prompt in a second region of the transparent interactive display; and in response to detecting one or more second user interactions with a portion of the second region of the transparent interactive display associated with a confirmation that the one or more selections printed in the first region of the physical ballot correctly reflects the user's intended one or more selections from among the first set of candidate information or measure information associated with the first race or ballot measure, advancing the physical ballot along a path behind the transparent interactive display such that a second region of the physical ballot overlaps with or is aligned with the first region of the transparent interactive display, and causing presentation of a second set of candidate information or measure information associated with a second race or ballot measure in the first region of the transparent interactive display.

2. The method of claim 1, further comprising:

determining, in response to one or more third user interactions with the transparent interactive display within the first region of the transparent interactive display during a time in which the second set of candidate information or measure information is presented therein, one or more second selections being selected by the user from among the second set of candidate information or measure information; and transmitting a second signal indicative of the one or more selections and instructions for printing the one or more selections within the second region of the physical ballot to the printing device, thereby causing the printing device to print, based at least on the second signal, the one or more selections in the second region of the physical ballot.

3. The method of claim 1, wherein the transparent interactive display comprises a touch-sensitive display.

4. The method of claim 1, wherein the one or more first user interactions with the transparent interactive display comprise one or more of: a touch, a tap, a swipe, or a translational motion by a finger of the user in the first region of the transparent interactive display.

5. The method of claim 1, further comprising:

determining, using a gaze tracking system, whether the user has reviewed the one or more selections printed on the physical ballot in said first region of the physical ballot;

in an instance in which it is determined that the user has reviewed the one or more selections printed on the physical ballot in said first region of the physical ballot, approving the one or more selections printed on the physical ballot in said first region of the physical ballot; and in an instance in which it is determined that the user has not reviewed the one or more selections printed on the physical ballot in said first region of the physical ballot, causing a reminder to be provided to the user to review and approve said one or more selections printed on the physical ballot in said first region of the physical ballot.

6. The method of claim 5, wherein the gaze tracking system comprises one or more cameras configured to capture images of the user's face, and one or more processors configured to determine a direction of viewing based at least upon the images of the user's face and determine if the direction of viewing corresponds to the one or more selections printed on the physical ballot in said first region of the physical ballot.

7. An apparatus comprising:

at least one processor; and at least one non-transitory memory comprising program code, wherein the at least one non-transitory memory and the program code are configured to, with the at least one processor, cause the apparatus to:

cause presentation, in a first region of a transparent interactive display associated with a first region of a physical ballot disposed behind the transparent interactive display and viewable through the transparent interactive display, of a first set of candidate information or measure information associated with a first race or ballot measure;

determine, in response to one or more first user interactions with the transparent interactive display within the first region of the transparent interactive display, one or more selections being selected by a user from among the first set of candidate information or measure information;

transmit a signal indicative of the one or more selections and instructions for printing the one or more selections within the first region of the physical ballot, thereby causing the printing device to print, based at least on the signal, the one or more selections in the first region of the physical ballot;

once the printing device has printed the one or more selections on the physical ballot in said first region of the physical ballot, cause presentation of a confirmation prompt in a second region of the transparent interactive display; and in response to detecting one or more second user interactions with a portion of the second region of the transparent interactive display associated with a confirmation that the one or more selections printed in the first region of the physical ballot correctly reflects the user's intended one or more selections from among the first set of candidate information or measure information associated with the first race or ballot measure, advance the physical ballot along a path behind the transparent interactive display such that a second region of the physical ballot overlaps with or is aligned with the first region of the transparent interactive display, and cause presentation of a second set of candidate information or measure information associated with a second race or ballot measure in the first region of the transparent interactive display.

8. The apparatus of claim 7, wherein the at least one non-transitory memory and the program code are further configured to, with the at least one processor, cause the apparatus to:

determine, in response to one or more third user interactions with the transparent interactive display within the first region of the transparent interactive display during a time in which the second set of candidate information or measure information is presented therein, one or more second selections being selected by the user from among the second set of candidate information or measure information; and transmit a second signal indicative of the one or more selections and instructions for printing the one or more selections within the second region of the physical ballot to the printing device, thereby causing the printing device to print, based at least on the second signal, the one or more selections in the second region of the physical ballot.

9. The apparatus of claim 7, wherein the transparent interactive display comprises a touch-sensitive display.

10. The apparatus of claim 7, wherein the one or more first user interactions with the transparent interactive display comprise one or more of: a touch, a tap, a swipe, or a translational motion by a finger of the user in the first region of the transparent interactive display.

11. The apparatus of claim 7, wherein the at least one non-transitory memory and the program code are further configured to, with the at least one processor, cause the apparatus to:
determine, using a gaze tracking system, whether the user has reviewed the one or more selections printed on the physical ballot in said first region of the physical ballot;
in an instance in which it is determined that the user has reviewed the one or more selections printed on the physical ballot in said first region of the physical ballot, approve the one or more selections printed on the physical ballot in said first region of the physical ballot; and
in an instance in which it is determined that the user has not reviewed the one or more selections printed on the physical ballot in said first region of the physical ballot, cause a reminder to be provided to the user to review and approve said one or more selections printed on the physical ballot in said first region of the physical ballot.

12. The apparatus of claim 11, wherein the gaze tracking system comprises one or more cameras configured to capture images of the user's face, and one or more processors configured to determine a direction of viewing based at least upon the images of the user's face and determine if the direction of viewing corresponds to the one or more selections printed on the physical ballot in said first region of the physical ballot.

13. A non-transitory computer storage medium comprising instructions configured to cause one or more processors to at least perform:
causing presentation, in a first region of a transparent interactive display associated with a first region of a physical ballot disposed behind the transparent interactive display and viewable through the transparent interactive display, of a first set of candidate information or measure information associated with a first race or ballot measure;
determining, in response to one or more first user interactions with the transparent interactive display within the first region of the transparent interactive display, one or more selections being selected by a user from among the first set of candidate information or measure information;
transmitting a signal indicative of the one or more selections and instructions for printing the one or more selections within the first region of the physical ballot to a printing device, thereby causing the printing device to print, based at least on the signal, the one or more selections in the first region of the physical ballot;
once the printing device has printed the one or more selections on the physical ballot in said first region of the physical ballot, causing presentation of a confirmation prompt in a second region of the transparent interactive display; and
in response to detecting one or more second user interactions with a portion of the second region of the transparent interactive display associated with a confirmation that the one or more selections printed in the first region of the physical ballot correctly reflects the user's intended one or more selections from among the first set of candidate information or measure information associated with the first race or ballot measure, advancing the physical ballot along a path behind the transparent interactive display such that a second region of the physical ballot overlaps with or is aligned with the first region of the transparent interactive display, and causing presentation of a second set of candidate information or measure information associated with a second race or ballot measure in the first region of the transparent interactive display.

14. The non-transitory computer storage medium of claim 13, further comprising instructions configured to cause the one or more processors to at least perform:
determine, using a gaze tracking system, whether the user has reviewed the one or more selections printed on the physical ballot in said first region of the physical ballot;
in an instance in which it is determined that the user has reviewed the one or more selections printed on the physical ballot in said first region of the physical ballot, approve the one or more selections printed on the physical ballot in said first region of the physical ballot; and
in an instance in which it is determined that the user has not reviewed the one or more selections printed on the physical ballot in said first region of the physical ballot, cause a reminder to be provided to the user to review and approve said one or more selections printed on the physical ballot in said first region of the physical ballot.

15. The non-transitory computer storage medium of claim 13, wherein the gaze tracking system comprises one or more cameras configured to capture images of the user's face, and one or more processors configured to determine a direction of viewing based at least upon the images of the user's face and determine if the direction of viewing corresponds to the one or more selections printed on the physical ballot in said first region of the physical ballot.

16. The non-transitory computer storage medium of claim 13, wherein the one or more first user interactions with the transparent interactive display comprise one or more of: a touch, a tap, a swipe, or a translational motion by a finger of the user in the first region of the transparent interactive display.

17. A voting system comprising:
a transparent interactive display;
a printing device configured to retain a physical ballot behind the transparent interactive display such that the physical ballot is viewable through the transparent interactive display;
at least one processor in operable communication with the transparent interactive display and the printing device; and
at least one non-transitory memory comprising program code, wherein the at least one non-transitory memory and the program code are configured to, with the at least one processor, the transparent interactive display, and the printing device, cause the apparatus at least to:
cause presentation, in a first region of the transparent interactive display associated with a first region of the physical ballot disposed behind the transparent interactive display and viewable through the transparent interactive display, of a first set of candidate information or measure information associated with a first race or ballot measure;
determine, in response to one or more first user interactions with the transparent interactive display within the first region of the transparent interactive display, one or more selections being selected by a user from among the first set of candidate information or measure information;
transmit a signal indicative of the one or more selections and instructions for printing the one or more selections within the first region of the physical ballot;
print, using said printing device, based at least on said signal, the one or more selections within the first region of the physical ballot;
once the printing device has printed the one or more selections on the physical ballot in said first region of the physical ballot, cause presentation of a confirmation prompt in a second region of the transparent interactive display; and
in response to detecting one or more second user interactions with a portion of the second region of the transparent interactive display associated with a confirmation that the one or more selections printed in the first region of the physical ballot correctly reflects the user's intended one or more selections from among the first set of candidate information or measure information associated with the first race or ballot measure, advance the physical ballot along a path behind the transparent interactive display such that a second region of the physical ballot overlaps with or is aligned with the first region of the transparent interactive display, and cause presentation of a second set of candidate information or measure information associated with a second race or ballot measure in the first region of the transparent interactive display.

18. The voting system of claim 17, wherein the transparent interactive display comprises a touch-sensitive display.

19. The voting system of claim 17, wherein the one or more first user interactions with the transparent interactive display comprise one or more of: a touch, a tap, a swipe, or a translational motion by a finger of the user in the first region of the transparent interactive display.

20. The voting system of claim 17, wherein the at least one non-transitory memory and the program code are further configured to, with the at least one processor, cause the apparatus to:
determine, using a gaze tracking system, whether the user has reviewed the one or more selections printed on the physical ballot in said first region of the physical ballot;
in an instance in which it is determined that the user has reviewed the one or more selections printed on the physical ballot in said first region of the physical ballot, approve the one or more selections printed on the physical ballot in said first region of the physical ballot; and
in an instance in which it is determined that the user has not reviewed the one or more selections printed on the physical ballot in said first region of the physical ballot, cause a reminder to be provided to the user to review and approve said one or more selections printed on the physical ballot in said first region of the physical ballot.

21. The voting system of claim 20, wherein the gaze tracking system comprises one or more cameras configured to capture images of the user's face, and one or more processors configured to determine a direction of viewing based at least upon the images of the user's face and determine if the direction of viewing corresponds to the one or more selections printed on the physical ballot in said first region of the physical ballot.

* * * * *